US005098612A

United States Patent [19]
Rowsell

[11] Patent Number: 5,098,612
[45] Date of Patent: Mar. 24, 1992

[54] METHOD OF PREPARING SOLIDIFIED AND STABILIZED HAZARDOUS OR RADIOACTIVE LIQUIDS

[76] Inventor: Farrell D. Rowsell, 2665 Belcastoro St., Las Vegas, Nebr. 89117

[21] Appl. No.: 550,717

[22] Filed: Jul. 9, 1990

Related U.S. Application Data

[63] Continuation-in-part of Ser. No. 285,719, Dec. 10, 1988, abandoned.

[51] Int. Cl.$^5$ .................................................. G21F 9/00
[52] U.S. Cl. ...................................... 252/628; 252/631; 210/751; 106/DIG.1; 106/724; 106/719; 106/648; 106/774; 588/252; 423/DIG. 20
[58] Field of Search ............... 252/628, 629, 631, 633; 405/128, 129; 210/751; 106/DIG. 1, 724, 719, 648, 774; 588/252

[56] References Cited

U.S. PATENT DOCUMENTS

| | | | |
|---|---|---|---|
| 3,274,784 | 9/1966 | Shock et al. | 252/628 |
| 3,565,649 | 2/1971 | Stone et al. | 106/94 |
| 3,867,160 | 2/1975 | Cooper | 106/90 |
| 4,017,417 | 4/1977 | Clark et al. | 252/626 |
| 4,060,425 | 11/1977 | Harada et al. | 106/94 |
| 4,149,968 | 4/1979 | Kupiec et al. | 405/128 |
| 4,188,231 | 2/1980 | Valore | 106/90 |
| 4,209,336 | 6/1980 | Previte | 106/90 |
| 4,293,343 | 10/1981 | Shannon | 106/90 |
| 4,402,753 | 9/1983 | Amara et al. | 106/94 |
| 4,416,810 | 11/1983 | Noakes | 252/628 |
| 4,439,062 | 3/1984 | Kingsbury | 405/128 |
| 4,475,952 | 10/1984 | Amara et al. | 106/94 |
| 4,528,129 | 7/1985 | Manchak | 252/628 |
| 4,587,279 | 5/1986 | Salyer et al. | 106/94 |
| 4,615,809 | 10/1986 | King | 405/129 |
| 4,650,590 | 3/1987 | Beall | 210/691 |
| 4,775,494 | 10/1988 | Rowsell et al. | 252/628 |
| 4,778,529 | 10/1988 | Barker et al. | 106/94 |
| 4,781,860 | 11/1988 | Doan | 252/628 |
| 4,828,761 | 5/1989 | Mattus et al. | 252/628 |
| 4,865,761 | 9/1989 | Mandel et al. | 252/190 |

Primary Examiner—Brooks H. Hunt
Assistant Examiner—Ngoclan Mai
Attorney, Agent, or Firm—Jerry R. Seiler

[57] ABSTRACT

An aqueous liquid or sludge waste is solidified by mixing it with a clay selected from the group consisting of sodium Montmorillonite, attapulgite, sepiolite, and mixtures thereof and a cementitious material coated with a fluid silicone polymer.

7 Claims, No Drawings

METHOD OF PREPARING SOLIDIFIED AND STABILIZED HAZARDOUS OR RADIOACTIVE LIQUIDS

This application is a continuation-in-part of a copending application Ser. No. 285,719 filed Dec. 10, 1988, now abandoned.

BACKGROUND OF THE INVENTION

In U.S. Pat. Nos. 4,781,860 and 4,775,494 there are disclosed methods for solidifying liquid wastes by incorporating sodium montmorillonite, attapulgite or sepiolite clays. The disclosure of the aforesaid patents are incorporated herein by reference. The resulting unpourable and free standing solid masses have been accepted as meeting most State, U.S. Environmental Protection Agency and U.S. Nuclear Regulatory Commission standards for disposing of such hazardous or radioactive liquid materials. For certain applications it is also desirable to achieve a relatively hard, more rigidly stabilized composition than those prepared using the aforesaid clays.

Another important requirement for the solidified compositions is resistance to leaching. Specifically, the Environmental Protection Agency specifies the requirements for leach resistance of the solidified compositions, which standards are determined by a prescribed test referred to as Toxicity Characteristic Leaching Procedure or TCLP. These standards set maximum leaching limits of various contaminants, including metals and aqueous organic compositions, from the solids containing such waste components. Another important factor is the expansion of the solidified composition; that is, the volumetric expansion of the final solidified mass as compared to the initial liquid or sludge volume. The expansion characteristics of the solidified mass are critical to the acceptability of the solidifying agent to achieve a solid mass suitable for disposal and/or storage. If expansion as a result of treatment of the waste liquid or sludge is significant, the amount of waste that can be solidified in a drum or other container or storage vessel is substantially reduced, the number of drums used for storing the same amount of waste to be solidified will be significantly increased, as will the cost of transporting, handling and storing the solidified composition. Normally, an expansion of more than about 25% of (or 1.25) times the original waste volume will be a serious economic problem, due to the high cost of land disposal.

In attempting to improve the hardness and strength of the solidified mass, the use of Portland cement has been proposed For example, in U.S. Pat. No. 4,149,968 there is disclosed a method of solidifying a hazardous liquid using a mixture of bentonite clay and Portland cement. However, when those materials are mixed and added to an aqueous liquid, or are added simultaneously to aqueous liquids as proposed by the aforesaid patent, because of the great affinity of the hydrated cement material for clay, the hydrated cement quickly reacts with or absorbs a substantial amount of the sodium and/or calcium thereby substantially reducing the effectiveness of the bentonite to capture the toxic components of the waste. Similarly, where Portland cement and sodium montmorillonite are combined and simultaneously added to aqueous liquids, the sodium is so absorbed by the hydrated cement that the clay is rendered substantially ineffective for adequate chemical stabilization of toxic components.

Attempts to resolve the aforesaid problems by sequential addition of the solidifying materials have not been generally satisfactory. For example, if Portland cement is first added to a typical Chromium waste liquid, followed by addition of the sodium montmorillonite, about 25% of the liquid will not be solidified. By reversing the sequence, although the amount of free standing or unsolidified liquid is reduced to about 12%, the results are still not generally acceptable for legal land disposal. Moreover, this sequential addition requirement precludes using pre-mixed materials, resulting in less efficient and less convenient processing of the liquids to be solidified. The present invention obviates the aforesaid disadvantages.

SUMMARY OF THE INVENTION

An improved method of solidifying and stabilizing a radioactive or hazardous liquid comprises mixing the liquid with a solidifying composition comprising a mixture of a clay selected from sodium montmorillonite, attapulgite or sepiolite, and a cement or pozzolanic material which has been homogeneously (and separately) mixed and coated with a liquid silicone. The clay and coated cement or pozzolan are then premixed and added to the aqueous waste simultaneously. Alternatively, where pre-mixing is not suitable, the materials may be added sequentially with the clay mixed first and thereafter adding the coated cement. The resulting composition is solid or substantially solid and may be handled, transported and stored under a variety of even extreme conditions for indefinite periods of time without evidence of liquid separation. The terms "solid" and "substantially solid", as used herein, are intended to define the compositions which are not pourable, and are free standing.

DETAILED DESCRIPTION OF THE INVENTION

The method of solidifying the hazardous or radioactive aqueous waste compositions according to the invention applies to aqueous solutions and mixtures which contain at least about 30% water. As used herein, the term "aqueous" is intended to define such liquid compositions. The additional liquid component of the hazardous or radioactive waste may include a great number of materials such as turbine, cutting and lubricating oils, solvent sludges, cleaning solvents and the like. Other liquid materials include water soluble or miscible organic liquids, for example, alcohols, and polyols such as polyhydric alcohols, alkylene glycols, for example, ethylene glycol, glycerol, polyglycerol esters, and polyglycols such as polyethylene glycol. The aqueous liquids may be contaminated with radioactive materials such as lubricants from reactor plant turbines, or liquids from hospital or other medical treatment sources which contain radioactive materials used in cancer treatment. From such sources, particularly common materials include the radioactive cobalts such as cobalt 57, cobalt 58 and cobalt 60, cesium, plutonium and uranium isotopes, and the like. However, it is to be understood, according to the invention, that any radioactive materials that are to be disposed of and are so defined by state or Federal laws or regulations are intended to be included in the compositions treated according to the method of this invention, as well as any later identified and added radioactive materials, regardless of source and regardless of the specific radioactive material or radioisotope.

Common hazardous waste materials include acids, bases, salts, esters, chlorinated hydrocarbons including PCB, dioxins, metal sludges, and the like. Again, these as well as the radioactive materials may be in substantially aqueous liquids, particularly those having 95% or more water, or they may be aqueous mixtures containing up to substantial amounts of hydrocarbons or other organic materials not miscible with water. As used herein, the term "hydrocarbons" is intended to define any oils, solvents and other hydrocarbons or non-aqueous liquids as generally described above which have been contaminated with radioactive materials or which themselves are considered hazardous chemicals according to governmental regulations.

The clay material used for solidifying and stabilizing the aqueous liquid composition according to the invention is selected from the group consisting of sodium montmorillonite, attapulgite, sepiolite, and mixtures thereof. As defined herein, sodium montmorillonite comprises a montmorillonite in which the major exchangeable cation is sodium and with smaller amounts of calcium and other exchangeable cations. The preferred material has over about 50% weight milliequivalents of sodium and exhibits a number of other properties as will be discussed hereinafter. A highly useful material is the sodium montmorillonite naturally occurring in Wyoming and certain areas of South Dakota and Montana having a unique combination of characteristics which qualify it as an extremely efficient chemical stabilizing and solidifying agent in treating the waste compositions according to the invention. Because of the large surface area to weight ratio and net negative surface charge, the concentration of cations, particularly sodium, are held in an exchangeable position on the montmorillonite particle which, when hydrated, act with the mineral structure to produce ordered water layers which are great distances from the particle surfaces. Because of this unique characteristic, the sodium montmorillonite, when added to an aqueous liquid results in a non-pourable flexible matrix that does not undergo phase separation except under extreme temperature and/or pressure conditions far beyond those encountered under storage and handling condition.

As previously noted, the sodium montmorillonite is that having sodium as the major exchangeable cation, preferably having over 50% milliequivalent exchangeable cation concentration, and more preferably between about 60 and about 70 sodium meq/%. Other cations include calcium, commonly between about 20 and about 35 meq/% with other typical cations including potassium, magnesium and iron in the aggregate range of between about 5 and abut 20 meq/%. However, such specific percentages are to be understood to be in the most preferred material, and materials outside of those specific ranges are to be included so long s the major sodium concentration is present. Of course, the naturally occurring material may be obtained from any source, an synthetic materials are also to be included within the purview of the invention.

In addition to the major sodium concentrations, the preferred material possesses high colloid content, liquid limits, plate water retention and cation exchange capacity. The colloid content of the sodium montmorillonite of the invention, is at least about 70%. The term "colloid content", as used herein, is intended to define that portion of material that is colloidal in the dispersing medium and has a particle size less than about 2 microns when it is dispersed. Preferred sodium montmorillonites will exhibit between about 70 and about 75% colloid content according to this definition. The liquid limit of the sodium montmorillonite is a minimum of about 500%. The liquid limit is determined by ANSI/ASTM D-423-66, and determines how much water (by weight) the material will hold without becoming liquid. Normally upper liquid limits of the sodium montmorillonite material used in the invention will be about 750%, with nominal averages being about 600%.

Another important feature of the sodium montmorillonite is the amount of water absorption determined by a plate water retention test, the material of the invention exhibiting a minimum of about 600%. This retention is determined according to ASTM standard E-946, with the upper practical limit being 1,000% and nominal figures for the most preferred material being between about 750 and about 800%. The preferred sodium montmorillonite cation exchange capacity is 70 meq/100 grams., up to even 95-100 meq/%; nominal ranges of the preferred material are between about 75 and 80 meq/%. A desirable moisture content of the material is a maximum of about 10%, by weight, and that can be achieved by simply drying the material prior to adding it to the liquid to be treated. It will be understood that where higher amounts of moisture are present, the effectiveness of the material for solidifying the liquid compositions will simply be somewhat reduced.

In treating the liquid, the particle size of the sodium montmorillonite may be important, depending on whether a pre-mix of the clay and coated cement is used or whether sequential addition is to be carried out. For a clay/coated-cement or clay/coated-pozzolan pre-mix, the sodium montmorillonite particle size range is not so important and any size range may be used, as well as for simultaneous clay and cement addition. However, if a sequential addition is desired in which case sodium montmorillonite must be added first, a 200 mesh or smaller particle size must be used, to prevent the liquid composition from becoming quickly solidified. Thus, for example, where the major amount of sodium montmorillonite particles are between about ⅜ inch and 20 mesh, liquid solidification occurs rapidly and prevents further mixing with the coated cement or pozzolan.

Attapulgite is a hydrated magnesium aluminum silicate, a clay mineral. Sepiolite, sometimes referred to as meerschaum, is a natural hydrous magnesium silicate. The preferred materials are those which meet the American Petroleum Institute specification for oil-well drilling-fluid materials, such as set forth in API Spec 13A, 11th Edition, July 1, 1985, Sections 5 and 6. The use of these clays is particularly desirable and useful in solidifying aqueous solutions having substantial amounts of dissolved solids content, above about 20,000 to 50,000 parts per million or higher. Sepiolite and attapulgite are also preferred for solidifying liquids containing water soluble or miscible organic liquids previously described, especially ethylene glycol, used extensively as coolant and antifreeze material, and glycerol. These clays are also used in powder or small particle size form, usually about 200 mesh, or finer.

In using the aforesaid sepiolite and attapulgite, be they aqueous, water soluble or miscible organic liquids, or mixtures thereof, it may be desirable to subject the compositions to substantial mechanical shear forces. This may be carried out by subjecting the liquid composition with the clay added in the aforesaid proportions to vigorous stirring or high-shear mixing.

When solidifying an aqueous waste having a moderate amount of dissolved solids, such as between about 5,000 and about 30,000 parts per million, it has been found that by using a sodium montmorillonite in combination with either or both of the aforesaid clays, substantial solidification or stiffness may be obtained using a smaller amount of total solidification agent mixture than if the attapulgite or sepiolite clays are used alone. For example, it has been found that by substituting between about 5% and about 45% of the attapulgite o sepiolite with sodium montmorillonite, the total amount of clay solidifying agent required to achieve solidification may be reduced by up to 25% or so. Preferred amounts of sodium montmorillonite used in this embodiment will be between about 20 and 33% of the total clay composition mixture.

The second ingredient of the solidifying and stabilizing composition to be used for the aqueous waste comprises a cement or pozzolan material selected from Portland cement, gypsum, lime, fly ash, kiln dust and mixtures thereof. These latter materials, sometimes referred to as pozzolans, may be used alone, or in mixtures, or combined with lime to produce a cementitious material in the presence of water. The term "cement" herein is intended to define all of the aforesaid compositions. According to the invention, the cement must be substantially homogeneously mixed with a liquid silicone coating material.

A suitable fluid silicone used for mixing and coating the particulate or powder cement material comprises a siloxane polymer, especially polydimethylsiloxane, commonly commercially available in fluids between 1.5 to about 1000 centistokes (cs) viscosity. Other liquid silicone materials include silicone resin systems comprising a solid silicone (siloxane polymer) in an organic solvent for silicone, commonly an aliphatic hydrocarbon.

The fluid silicone is mixed with the dry cement material in an amount of preferably between about 0.01% and about 10%, by weight. The liquid coating material may be sprayed into the powder cement and thoroughly mixed, or it may be mixed in a fog chamber, or cement mixer or the like to achieve the desired homogeneity.

As previously noted, the clay and coated cement may be pre-mixed and then added to the aqueous liquid to be solidified. Alternatively, the clay, usually of about 200 mesh or finer, may be added first, followed by addition of the coated cement. The advantage of using a pre-mix is that all of the solidifying agent is conveniently in a single batch, which may be pre-mixed and stored in bulk or packaged for later use. Moreover, the particle size of the clay is not critical and thus larger size sodium montmorillonite previously described may be used to prepare the pre-mix. In pre-mixing the clay and cement solidifying material, ratios of between about 1:4 an 4:1, by weight, respectively, are suitable. When pre-mixing the two materials, they should be mixed to achieve a substantially homogeneous blend.

The amount of clay and cement used to achieve a desired solidified and stabilized free standing mass is as follows. Generally, for aqueous wastes containing above about 75% by weight water or water miscible liquid, the amount of total solidifying agent (clay and cement) should be between about 2 and about 8 pounds per gallon of liquid. Where a smaller amount of clay is used, the greater amount of solidifying agent to make up for the difference should be coated cement, and vice versa. However, most preferred, the amount of clay and coated cement should be approximately equal.

Where the waste to be solidified contains at least about 5% or more hydrocarbon or water immiscible liquid, an organic ammonium montmorillonite may be substituted as a portion of the clay. This material is disclosed in U.S. Pat. No. 4,778,627 the description of which is incorporated herein by reference. These organic ammonium montmorillonites may be substituted for the sodium montmorillonite, attapulgite or sepiolite clays in a direct proportion based on the amount of hydrocarbon or water immiscible liquid present in the liquid to be solidified. Where hydrocarbon or water immiscible liquids are present in any substantial amount, justifying the use of the organic ammonium montmorillonite, solidification may be further enhanced by using a small amount of polar organic compound also described in the aforesaid application and incorporated herein by reference. Most preferred materials are the lower molecular weight alcohols having between one and about 8 carbon atoms, particularly methyl alcohol, ethyl alcohol, n-propyl alcohol and isopropyl alcohol. The amount of polar organic compound used will be between about 1 and about 10% based on the volume of liquid hydrocarbon to be solidified. Of course, where the waste liquid already includes a polar organic compound such as alcohols, acetates, ethers, ketones, benzoates and halogenated hydrocarbons having between about 1 and about 10 carbon atoms, it will not be necessary to add additional polar material. However, when it is desirable to add the polar organic compound, amounts of between 1 and about 10%, by volume, based on the hydrocarbon present in the waste mixture will be suitable. Although the solidification and stabilization system of the invention may be used for liquids having a substantial amount of hydrocarbon or other water immiscible liquid present, incorporating the organic ammonium montmorillonite as a portion of the clay to be used along with the coated cement material, the system should not be used where the amount of liquid hydrocarbon is greater than about 50%, by weight of the liquid, and preferably not greater than about 30%.

Following addition of both the clay and the coated cement solidifier, whether added sequentially, together simultaneously, or in a pre-mix composition, the total mixture is thoroughly mixed by any suitable means of agitation to a substantially homogeneous composition. It is then allowed to cure, with nominal cure times being at least 72 hours. The resulting solidification will be on in which the mass is unpourable and free-standing. Moreover, to meet the more rigid stabilization requirements, it should be capable of meeting a 50 psi test without releasing liquid, or collapsing.

By way of example, hazardous waste materials were treated using laboratory equivalents as follows:

EXAMPLE 1

To a first sample of hazardous liquid comprising of aqueous solution of 0.1% cadmium chloride, two pounds of sodium montmorillonite (200 mesh) was added per gallon of liquid. The composition was thoroughly mixed and after 5 minutes, two pounds of Portland cement which had previously been thoroughly mixed with 2%, by weight, of DOW Corning ® 200 polydimethylsiloxane fluid, 10 cs, was added and the resulting total composition thoroughly mixed. After three days, the mixture was found to be a free-standing solidified mass. A plug of the solidified material was subjected to a liquid release test using a 100 ml test plug placed in a 3 inch diameter cylinder and pressured to 50 psi using a free-floating piston driven by compressed air. A filter paper was placed under the test plug during the test and no liquid was found to have been pressed from the test plug.

EXAMPLE 2

The experiment of Example 1 was repeated substituting a 50/50 mixture of attapulgite and sepiolite for the sodium montmorillonite. Substantially identical results were obtained.

EXAMPLE 3

In this example, sodium montmorillonite (200 mesh) and silicone-treated Portland cement was pre-mixed in a 1:1 mix ratio, by weight. The clay-cement mixture was then added to the aqueous solution of Example 1 and thoroughly mixed. The test results of the solidified and stabilized solid mass were substantially identical.

EXAMPLE 4

The test of Example 3 was repeated using sodium montmorillonite having a particle size of between 4 an 10 mesh. The results were substantially identical.

EXAMPLE 5

A mixture of 50% of the aqueous solution of Example 1 and 50% lubricating oil were solidified using a pre-mix of sodium montmorillonite and dimethyl dehydrogenated tallow ammonium montmorillonite in a 1:1 weight ratio and 50%, by weight of the silicone treated Portland cement of Example 1. The resulting liquid composition became solidified and was tested according to Example 1 with substantially identical results.

To show the improved results of the compositions of the invention in solidifying hazardous liquid wastes, the following tests were conducted. In each test, the amount of solid material used was the minimum amount necessary to achieve a hard, free standing solid, without free standing liquid. In each sample, the solidifying material was added and mixed with the liquid and allowed to stand for 96 hours in a container. The resulting solid was measured for expansion and free standing water. The liquid treated was an aqueous chromium waste containing 54,000 ppm chromium comprising chromic oxide and sodium dichromate in 1% sulfuric acid.

EXAMPLE 6

The solidifier used was a 50/50 weight pre-mix of sodium montmorillonite and Portland cement coated with 0.2% wt. DOW Corning ® 200 polydimethylsiloxane fluid (10 cs).

EXAMPLE 7

The solidifier was the same as Example 6 with sepiolite substituted for the sodium montmorillonite.

EXAMPLE 8

The solidifier was the same as Example 6 with attapulgite substituted for the sodium montmorillonite.

EXAMPLE 9

The solidifier used was uncoated Portland cement.

EXAMPLE 10

The solidifier used was the silicone coated Portland cement used in Example 6.

EXAMPLE 11

The solidifier used was sodium montmorillonite.

EXAMPLE 12

The solidifier used was a 50/50 weight pre-mix of uncoated Portland cement and sodium montmorillonite.
The results are summarized as follows:

| Example | Amount to Solidify (lbs/gal) | Expansion (% of orig. vol) |
| --- | --- | --- |
| 6 | 4.5 | 20 |
| 7 | 4.5 | 20 |
| 8 | 4.5 | 20 |
| 9 | 6 | 70 |
| 10 | 11 | 80 |
| 11 | 3.5 | 13 |
| 12(a)* | 4.5 | n/a |
| (b) | 12 | 75 |

*The amount of free standing, unsolidified liquid remaining was 17.5% of the original liquid volume.

The test results shown above illustrate the improved features of the solidification compositions of the present invention, Examples 6-8, as compared to the use of uncoated cement itself, Example 9, or silicone coated cement itself, Example 10, both of which resulted in greatly expanded solids. The amount of silicone coated cement required (used alone) to produce a solid was almost 2.5 times the amount of mixed solidifier of the invention used. In Example 12(b), a 50/50 mix of uncoated Portland cement and sodium montmorillonite required almost 3 times the amount of solidifier to fully solidify the liquid compared to the amount of solidifier used in Examples 6-8, with the resulting 12(b) solid substantially expanded.

What is claimed is:

1. In the solidification of an aqueous liquid or sludge to produce an unpourable, free standing solid mass, an improved method for reducing the dimensional expansion of said solid mass during said solidification comprising:

mixing particles of a cementitious material comprising Portland cement, gypsum, fly ash, kiln dust, lime, or mixtures thereof, with between about 0.1 and about 20%, by weight, of a fluid silicone polymer to produce a silicone coated cementitious material, adding to said aqueous liquid or sludge a solidifying composition comprising a mixture of a clay selected from the group consisting of sodium montmorillonite, attapulgite, sepiolite, and mixtures thereof, and said silicone coated cementitious material, wherein the ratio of said clay:said silicone coated cementitious material is between about 1:4 and 4:1, by weight, respectively, mixing said aqueous waste and said solidifying composition until substantially homogeneous, and allowing the resulting mixture to set for at least about three days.

2. The method of claim 1 wherein the amount of solidifying composition added to said liquid is equivalent to between about 2 and about 8 pounds per gallon of liquid.

3. In the solidification of an aqueous waste to produce an unpourable, free standing solid mass, an improved method for reducing the dimensional expansion of said solid mass during said solidification comprising:

mixing particles of a cementitious material comprising Portland cement, gypsum, fly ash, kiln dust, lime, or mixtures thereof, with between about 0.05% and about 20%, by weight, of a fluid silicone polymer to produce a silicone coated cementitious material, adding to said aqueous waste a clay selected from the group consisting of sodium montmorillonite, attapulgite, sepiolite, and mixtures thereof, and mixing the resulting composition, thereafter adding to the resulting composition said silicone coated cementitious material, mixing the ingredients until substantially homogeneous, and allowing the resulting mixture to set for at least about three days.

4. The method of claim 3 wherein the ratio of said clay:said silicone coated cementitious material is between about 1:4 and 4:1 by weight, respectively.

5. The method of claim 4 wherein the combined amount of clay and silicone coated cementitious material added to said liquid is equivalent to between about 2 and about 8 pounds per gallon of liquid.

6. An unpourable, free-standing solidified mass composition formed by mixing a radioactive or hazardous aqueous waste and mixture of a clay selected from the group consisting of sodium montmorillonite, attapulgite, sepiolite, and mixtures thereof, and cementitious material comprising Portland cement, gypsum, fly ash, kiln dust, lime, or mixtures thereof coated with from about 0.1 and about 20%, by weight, of a liquid silicone polymer wherein the ratio of said clay: coated cementitious material is between about 1:4 and 4:1, by weight, respectively, said mixture being present in an amount equivalent to between about 2 and about 8 pounds per gallon of said liquid.

7. A composition for solidifying an aqueous waste to achieve an unpourable, free-standing solid mass comprising a mixture of a clay selected from the group consisting of sodium montmorillonite, attapulgite, sepiolite, and mixtures thereof, and a substantially homogeneous mixture of a cementitious material comprising Portland cement, gypsum, fly ash, kiln dust, lime, or mixtures thereof, and from about 0.1 and about 20%, by weight, of a liquid silicone polymer wherein the ratio of said clay:said substantially homogeneous mixture is between about 1:4 and 4:1, by weight, respectively.

* * * * *